(12) United States Patent
Ito et al.

(10) Patent No.: US 7,049,008 B2
(45) Date of Patent: May 23, 2006

(54) HYDROGEN-PERMEABLE MEMBRANE AND MANUFACTURING METHOD OF THE SAME

(75) Inventors: Naoki Ito, Yokohama (JP); Satoshi Aoyama, Susono (JP); Toshihide Nakata, Sapporo (JP); Masahiko Iijima, Iruma-gun (JP); Hiromichi Sato, Atsugi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 360 days.

(21) Appl. No.: 10/351,531

(22) Filed: Jan. 27, 2003

(65) Prior Publication Data
US 2003/0148884 A1    Aug. 7, 2003

(30) Foreign Application Priority Data
Feb. 4, 2002    (JP)    ............... 2002-026935

(51) Int. Cl.
   B32B 15/01    (2006.01)
   B05D 5/00    (2006.01)
(52) U.S. Cl. ............... 428/662; 428/670; 427/404; 427/405
(58) Field of Classification Search ............... 428/662, 428/670; 427/404, 405, 125
   See application file for complete search history.

(56) References Cited

U.S. PATENT DOCUMENTS

| | | | | |
|---|---|---|---|---|
| 2,719,797 A | * | 10/1955 | Rosenblatt et al. ...... | 428/662 X |
| 4,076,888 A | * | 2/1978 | Perugini et al. ........ | 427/404 X |
| 4,200,975 A | * | 5/1980 | Debiec et al. .......... | 427/125 X |
| 5,738,708 A | * | 4/1998 | Peachey et al. ........ | 427/405 X |
| 5,985,468 A | * | 11/1999 | Sugg et al. ............ | 428/670 X |
| 6,461,408 B1 | * | 10/2002 | Buxbaum ............... | 95/55 |
| 6,596,057 B1 | * | 7/2003 | Edlund et al. .......... | 96/4 |

FOREIGN PATENT DOCUMENTS

| | | |
|---|---|---|
| DE | 32 35 578 A1 | 3/1984 |
| EP | 1 258 283 A1 | 11/2002 |
| JP | A 1-219001 | 9/1989 |
| JP | A 1-266833 | 10/1989 |
| JP | 11-057432 A | 3/1999 |
| JP | 11-114388 | 4/1999 |
| JP | A 11-276866 | 10/1999 |
| JP | 2001-029761 A | 2/2001 |

OTHER PUBLICATIONS

Buxbaum, Palladium-Coated Metal Membranes For Ultra High Purity Hydrogen And Future Application, www.rebresearch.com/membs/MetMems.mtml.*
English Translation of JP A 11-276866 (Oct. 12, 1999).
Japanese Office Action mailed Nov. 15, 2005 and English-language translation.

* cited by examiner

*Primary Examiner*—Stephen J. Kalafut
(74) *Attorney, Agent, or Firm*—Oliff & Berridge, PLC

(57) ABSTRACT

A hydrogen-permeable membrane includes a permeable layer which has a function of making hydrogen permeate therethrough, and a catalyst layer which acts as a catalyst for promoting permeation of the hydrogen in the permeable layer. An area of the catalyst layer which contacts gas is larger than an area of the permeable layer.

11 Claims, 8 Drawing Sheets

HYDROGEN-PERMEABLE MEMBRANE AND MANUFACTURING METHOD OF THE SAME

INCORPORATION BY REFERENCE

The disclosure of Japanese Patent Application No. 2002-26935 filed on Feb. 4, 2002, including the specification, drawings and abstract is incorporated herein by reference in its entirety.

BACKGROUND OF THE INVENTION

1. Field of the Invention

The invention relates to a hydrogen-permeable membrane and a manufacturing method thereof.

2. Description of Related Art

A fuel cell system includes a fuel cell, a fuel gas supplying portion which supplies a fuel gas containing a hydrogen gas to the fuel cell, and an oxidizing gas supplying portion which supplies an oxidizing gas containing an oxygen gas to the fuel cell. There are methods of supplying the fuel gas to the fuel cell; a method of directly supplying a stored hydrogen gas; and a method of supplying a hydrogen gas by producing the hydrogen gas from a hydrocarbon compound such as methanol. In the case where the latter method is adopted, the fuel gas supplying portion normally includes a reforming portion which generates a mixed gas (a reformed gas) containing the hydrogen gas from the hydrocarbon compound, and a hydrogen separating portion which separates the hydrogen gas from the reformed gas.

A hydrogen-permeable membrane for making the hydrogen selectively permeate therethrough is provided to the hydrogen separating portion. The reformed gas containing the hydrogen gas is supplied to one surface of the hydrogen-permeable membrane, and the hydrogen gas is extracted from the other surface.

Japanese Patent Laid-Open Publication No. 11-276866 discloses a hydrogen-permeable membrane of a self-supporting membrane type in which Pd (palladium) coating layers are formed on both surfaces of a V (vanadium) base layer. However, when the hydrogen-permeable membrane of this type is used, sufficient hydrogen permeability cannot be obtained.

SUMMARY OF THE INVENTION

It is an object of the invention to provide an art in which hydrogen permeability of the hydrogen-permeable membrane can be enhanced.

A first aspect of the invention relates to a hydrogen-permeable membrane which includes a permeable layer having a function of making the hydrogen permeate therethrough, and a catalyst layer which acts as a catalyst for promoting the permeation of the hydrogen contained in the permeable layer, and which is provided on at least one surface of the permeable layer to form a surface layer of the hydrogen-permeable membrane. A contact area of the catalyst layer which contacts gas is larger than an area of the permeable layer.

In the hydrogen-permeable membrane, since the contact area of the catalyst layer is larger than the area of the permeable layer, the number of active spots in the catalyst layer is relatively large. Accordingly, a rate of catalytic reaction (catalytic performance) by the catalyst layer can be enhanced, which consequently improves the hydrogen permeability of the hydrogen-permeable membrane.

Meanwhile, when the catalyst layer is exposed to a catalyst poison such as a carbon monoxide gas, the catalytic performance deteriorates due to being poisoned. Also, when an operating temperature of the hydrogen-permeable membrane is relatively low, the catalytic performance of the catalyst layer is likely to deteriorate. However, in the hydrogen-permeable membrane according to the first aspect, since the number of the active spots is relatively large, the deterioration in catalytic performance of the catalyst layer can be suppressed. Namely, the hydrogen-permeable membrane according to the first aspect can exhibits relatively high hydrogen permeability even in the above-mentioned case.

A second aspect of the invention relates to a hydrogen-permeable membrane which includes a permeable layer that contains a Group VA element and has a function of making a hydrogen permeate therethrough, and a catalyst layer which functions as a catalyst for promoting permeation of the hydrogen in the permeable layer, and which is provided on at least one surface of the permeable layer to form a surface of the hydrogen-permeable membrane. The catalyst layer contains at least one metal element selected from a group consisting of Ru (ruthenium), Rh (rhodium), Ir (iridium), Pt (platinum), Re (rhenium) and Ni (nickel).

The Group VA elements have excellent hydrogen permeability. Any metal element in the group acts as a catalyst on the hydrogen to promote the permeation of the hydrogen in the permeable layer. Therefore, the hydrogen permeability of the hydrogen-permeable membrane can be enhanced by selecting a metal element which is contained in the catalyst layer in accordance with a use condition of the hydrogen-permeable membrane.

A third aspect of the invention relates to a manufacturing method of the hydrogen-permeable membrane which makes hydrogen selectively permeate therethrough. This method includes steps of preparing a base body, arranging the base body in an inert atmosphere, and sequentially forming, in the inert atmosphere, a first layer which contains Pd on the base body, a second layer which contains a Group VA element on the first layer, and a third layer which contains Pd on the second layer.

By employing this method, the hydrogen-permeable membrane in which layers containing Pd are formed on both surfaces of the layer containing a Group VA element. Each layer of the hydrogen-permeable membrane is sequentially formed in the inert atmosphere. Therefore, deterioration of the hydrogen permeability due to a fact that there exists an impurity such as an oxide or the like on an interface of each layer of the hydrogen-permeable membrane can be prevented. Namely, the hydrogen permeability of the manufactured hydrogen-permeable membrane can be enhanced by employing the above-mentioned method.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

The invention can be implemented in a variety of forms such as a fuel cell system in which a hydrogen-permeable membrane is used, an apparatus such as a movable body on which the fuel cell system is mounted, a hydrogen purifying device in which the hydrogen-permeable membrane is used, and the like.

A. First Embodiment

Figure 1:
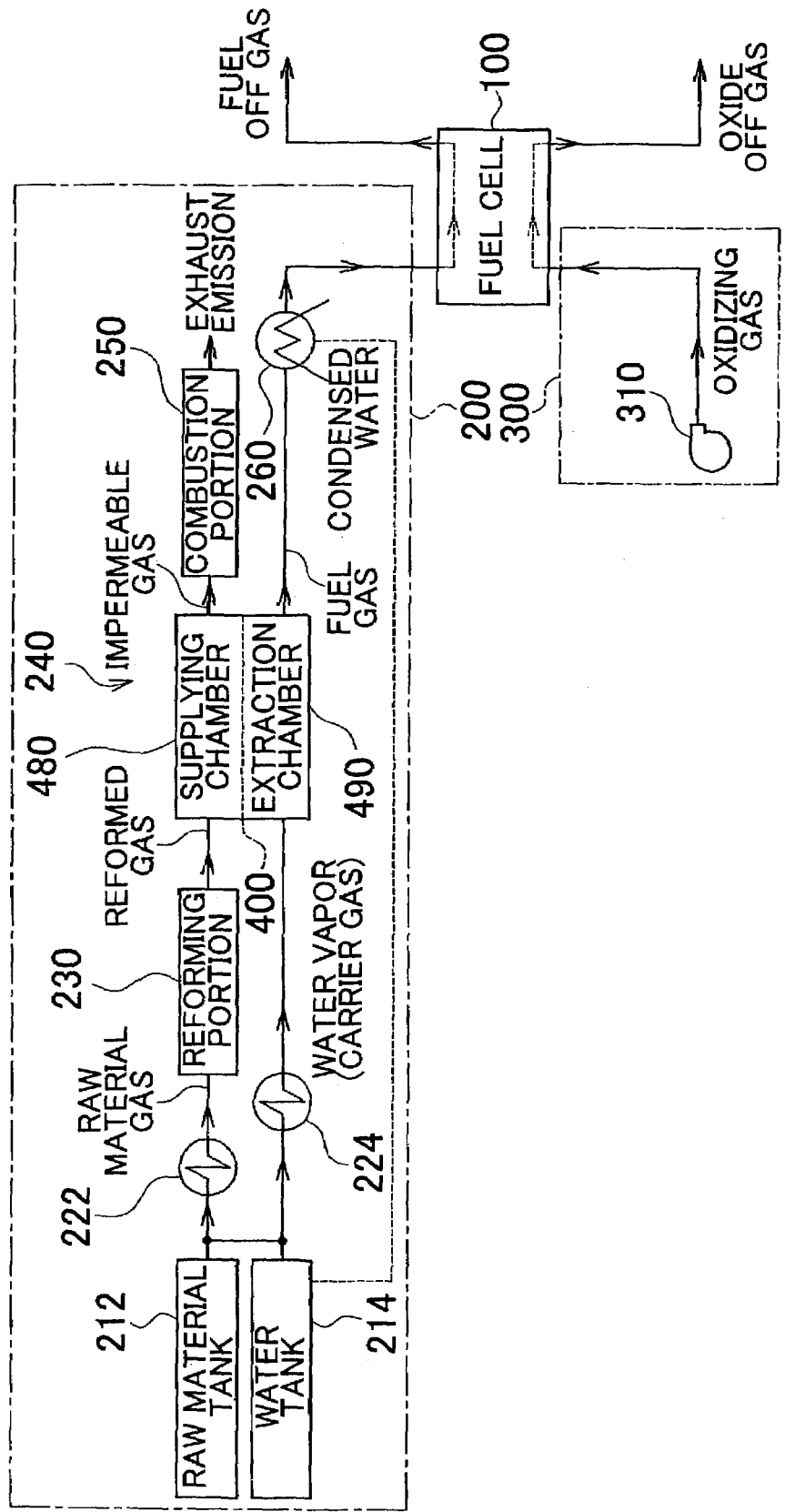
FIG. 1 is an explanatory view showing a schematic configuration of a fuel cell system according to a first embodiment.

A-1. Fuel Cell System:

Next, embodiments of the invention will be explained. FIG. 1 is an explanatory view showing an outline of a fuel cell system according to a first embodiment. The fuel cell system includes a fuel cell 100, a fuel gas supplying portion 200 which supplies a fuel gas containing a hydrogen gas to the fuel cell, and an oxidizing gas supplying portion 300 which supplies an oxidizing gas containing an oxygen gas to the fuel cell. Note that the fuel cell 100 is a polymer electrolyte fuel cell which is relatively compact and excels in generation efficiency.

The fuel gas supplying portion 200 shown in FIG. 1 generates the fuel gas containing the hydrogen gas, and supplies it to the fuel cell 100. The fuel gas supplying portion 200 includes a raw material tank 212, a water tank 214, a first evaporator 222, a second evaporator 224, a reforming portion 230, a hydrogen separating portion 240, a combustion portion 250, and a condenser 260. Note that methanol is stored in the raw material tank 212.

A liquid mixture in which the methanol from the raw material tank 212 and water from the water tank 214 are mixed is introduced into the first evaporator 222. The first evaporator 222 evaporates the introduced liquid mixture, and supplies a mixed gas of methanol and water (hereinafter referred to as a raw material gas) to the reforming portion 230. The second evaporator 224 evaporates the water introduced from the water tank 214, and supplies water vapor to an extracting chamber 490 of the hydrogen separating portion 240.

The reforming portion 230 supports a catalyst which promotes a reforming reaction, and reforms the supplied raw material gas to generate a reformed gas containing the hydrogen gas. As a catalyst, for example, a CuO—ZnO type catalyst or a Cu—ZnO type catalyst can be employed. In the reforming portion 230, chemical reactions shown in following equations (1), (2) sequentially proceed, and the reformed gas containing the hydrogen gas is generated. Namely, as a whole chemical reaction in the reforming portion 230, a reforming reaction shown in an equation (3) proceeds. Note that this reforming reaction is referred to as a steam reforming.

$$CH_3OH \rightarrow CO + 2H_2 \quad (1)$$

$$CO + H_2O \rightarrow CO_2 + H_2 \quad (2)$$

$$CH_3OH + H_2O \rightarrow CO_2 + 3H_2 \quad (3)$$

Figure 2:
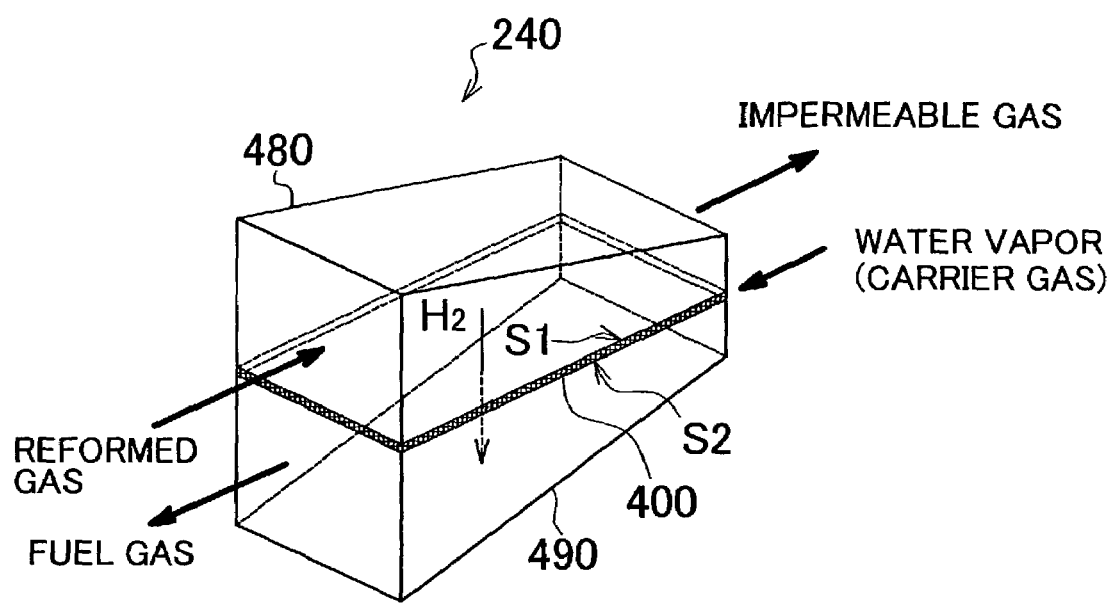
FIG. 2 is an explanatory view showing an example of a hydrogen separating portion 240.

The hydrogen separating portion 240 generates a fuel gas containing the hydrogen gas by separating the hydrogen gas from the reformed gas supplied from the reforming portion 230. The hydrogen separating portion 240 includes a hydrogen-permeable membrane 400, a supplying chamber 480, and an extracting chamber 490. The reformed gas is supplied to the supplying chamber 480 from the reforming portion 230, and the water vapor is supplied to the extracting chamber 490 from the second evaporator 224. FIG. 2 is an explanatory view showing an example of the hydrogen separating portion 240. As shown in the figure, the hydrogen separating portion 240 is formed by integrating the hydrogen-permeable membrane 400, the supplying chamber 480 and the extracting chamber 490. The hydrogen-permeable membrane is sandwiched between the supplying chamber 480 and the extracting chamber 490. Note that FIG. 1 shows that the reformed gas and the water vapor flow in the same direction. However, the reformed gas and the water vapor actually flow in opposed directions.

The hydrogen-permeable membrane 400 separates the hydrogen gas from the reformed gas (including the raw material gas, a carbon monoxide gas, carbon dioxide gas, the hydrogen gas and the like) supplied to the supplying chamber 480 by making the hydrogen gas selectively permeate therethrough. Namely, the reformed gas containing the hydrogen gas is supplied to a first surface S1 of the hydrogen-permeable membrane 400, and only the hydrogen gas permeates therethrough and comes out from a second surface S2. Note that the hydrogen-permeable membrane 400 will be explained later in detail.

The water vapor supplied to the extracting chamber 490 functions as a carrier gas for carrying the hydrogen gas which permeates through the hydrogen-permeable membrane, and promotes the permeation of the hydrogen gas. Namely, the hydrogen gas in the supplying chamber 480 permeates through the hydrogen-permeable membrane in accordance with a difference between a partial pressure of hydrogen in the supplying chamber 480 and that in the extracting chamber 490. More particularly, the hydrogen gas permeates through the hydrogen-permeable membrane proportional to a difference between a square root of the partial pressure of the hydrogen in the supplying chamber and a square root of the partial pressure of the hydrogen in the extracting chamber. Accordingly, in the embodiment, the carrier gas (water vapor) is sequentially supplied to the extracting chamber 490 such that the partial pressure of the hydrogen in the extracting chamber 490 is lower than the partial pressure of the hydrogen in the supplying chamber 480.

It should be noted that, in embodiment, the reformed gas and the carrier gas are set to flow in opposed directions in the supplying chamber 480 and the extracting chamber 490, as shown in FIG. 2. However, in place of this, the reformed gas and the carrier gas may be set to flow in parallel, or to flow in orthogonal directions. However, in a case, such as the embodiment, where the reformed gas and the carrier gas form opposed flows, the hydrogen gas can be relatively efficiently separated from the reformed gas.

The combustion portion 250 shown in FIG. 1 oxidizes an impermeable gas (that is, a gas which does not permeate through the hydrogen-permeable membrane) which is released from the supplying chamber 480. More particularly, the carbon monoxide gas is oxidized into the carbon dioxide gas, and the hydrogen gas is oxidized into the water vapor. As a result, the carbon monoxide gas which is contained in the impermeable gas can be prevented from being released into the atmosphere.

The condenser 260 supplies the fuel gas to the fuel cell 100 after condensing and removing the water vapor which is contained in the fuel gas released from the extracting chamber 490. Note that condensed water which is obtained in the condenser 260 is returned to the water tank 214.

The oxidizing gas supplying portion 300 shown in FIG. 1 includes a blower 310, and supplies the oxidizing gas (air) containing the oxygen gas to the fuel cell 100.

The fuel cell 100 shown in FIG. 1 generates electricity using the fuel gas which is supplied from the fuel gas supplying portion 200, and the oxidizing gas which is supplied from the oxidizing gas supplying portion 300.

Figure 3:
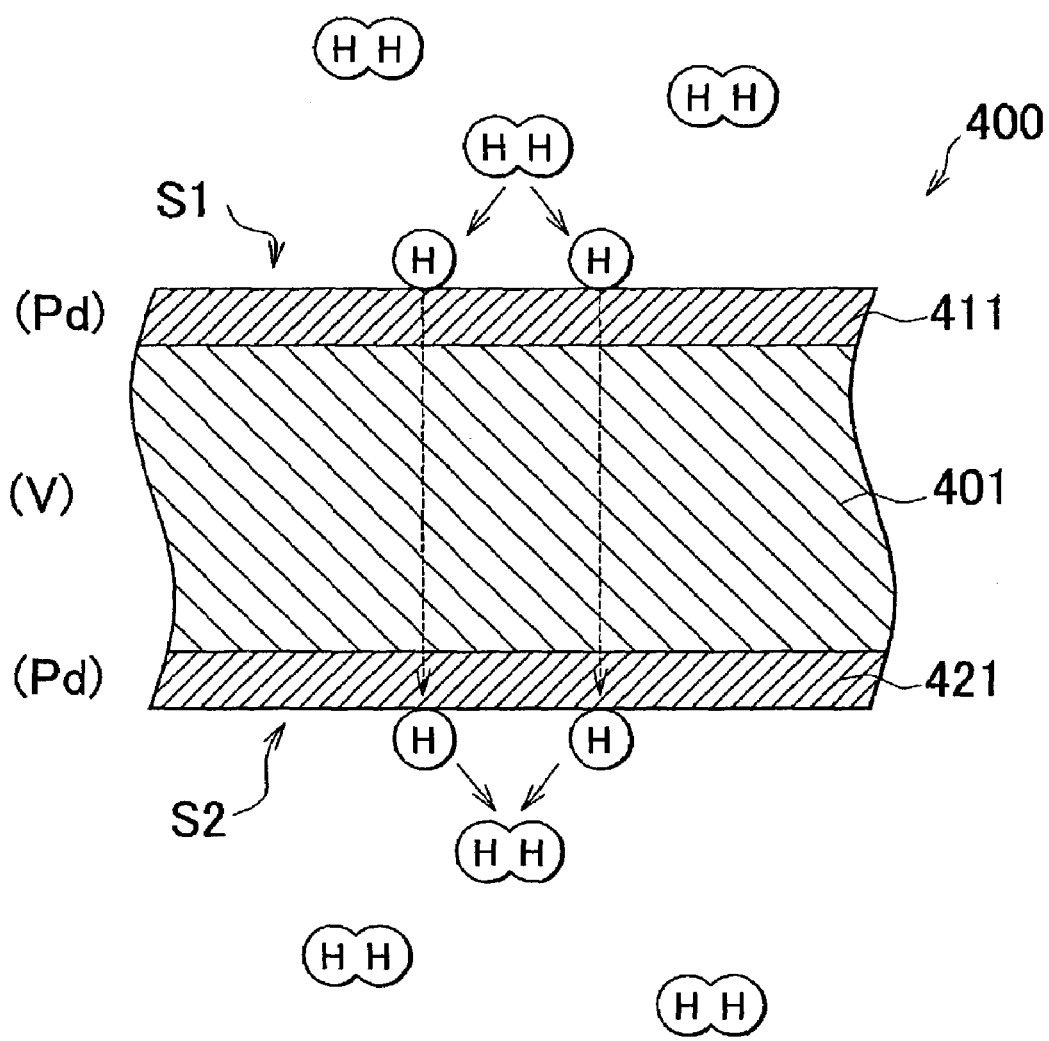
FIG. 3 is an explanatory view in schematic form showing a vertical section of a hydrogen-permeable membrane 400 shown in FIG. 1.

A-2. Hydrogen-Permeable Membrane:

FIG. 3 is an explanatory view in schematic form showing a vertical section of the hydrogen-permeable membrane 400 shown in FIG. 1. Note that the hydrogen-permeable membrane 400 is a metal self-supporting membrane in sheet form.

As shown in FIG. 3, the hydrogen-permeable membrane 400 has a three-layer structure. More particularly, the hydrogen-permeable membrane includes one base layer 401, and two coating layers 411, 421, one of the coating layers being formed on one surface of the base layer 401 and the other coating layer being formed on the other surface of the base layer 401, which are formed on both surfaces of the base layer 401. The first coating layer 411 forms a surface layer of the first surface S1 of the hydrogen-permeable membrane, and the second coating layer 421 forms a surface layer of the second surface S2 of the hydrogen-permeable membrane.

The base layer 401 contains a Group VA element. As a Group VA element, V (vanadium), Nb (niobium), Ta (tantalum) or the like can be employed. Coating layers 411, 421 contain Pd (palladium). Note that the base layer 401, and the coating layers 411, 421 are formed in thickness of, for example, approximately 20 μm and approximately 30 μm, respectively.

Hereafter, a case where the base layer 401 is formed of V, and the coating layers 411, 421 are formed of Pd will be explained as an example.

It is considered that a hydrogen molecule permeates through the hydrogen-permeable membrane 400 in the processes shown in FIG. 3. Namely, the hydrogen molecule is initially dissociated into two hydrogen atoms in the first Pd coating layer 411. The hydrogen atoms obtained by dissociating the hydrogen molecule sequentially permeate through each layer 411, 401, 421. Then, the two hydrogen atoms which have permeated through the layers are recombined in the second Pd coating layer 421 to be a hydrogen molecule.

As can be understood from the explanation, V which forms the base layer 401 has a function of making the hydrogen permeate therethrough. Also, Pd which forms the coating layers 411, 421 have a function of making the hydrogen permeate therethrough as well as a function of acting as a catalyst on the hydrogen to promote the dissociation of the hydrogen molecule into the hydrogen atoms and the recombination of the hydrogen atoms into the hydrogen molecule. Note that the hydrogen permeability of V is considerably superior to the hydrogen permeability of Pd.

As a manufacturing method of the hydrogen-permeable membrane of self-supporting membrane type shown in FIG. 3, the following method is known. First, a V base layer (foil) is prepared, and a surface of the V base layer is cleaned by etching or the like. Then, Pd coating layers are formed on both surfaces of the V base layer. The cleaning processing is preformed in order to remove an impurity such as an oxide formed on the surface of the V base layer. Namely, when the cleaning processing is not performed, the impurity remains on an interface of each layer of the hydrogen-permeable membrane. When the impurity remains, the hydrogen permeability of the hydrogen-permeable membrane deteriorates. Therefore, in the method, the deterioration of the hydrogen permeability due to the impurity which remains on the interface of each layer of the hydrogen-permeable membrane is suppressed by performing the cleaning processing.

However, in the above-mentioned method, there is a possibility that the impurity on the V base layer is not completely removed. In addition, the cleaning processing takes a lot of trouble. Accordingly, in the embodiment, a manufacturing method is devised such that the impurity does not intrude in the interface of each layer while omitting the cleaning processes.

Figure 4:
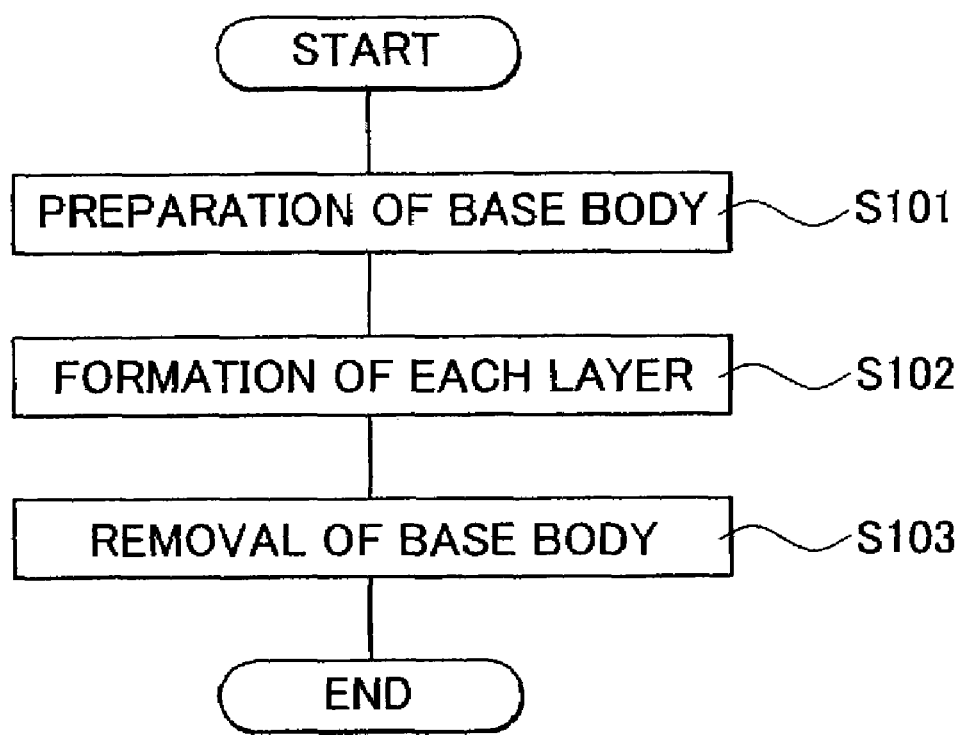
FIG. 4 is a flow chart showing a manufacturing procedure of the hydrogen-permeable membrane 400 shown in FIG. 3.

FIG. 4 is a flow chart showing a manufacturing procedure of the hydrogen-permeable membrane 400 shown in FIG. 3. FIGS. 5A to 5E are explanatory views showing the hydrogen-permeable membrane 400 manufactured according to the flow chart shown in FIG. 4.

Figure 5A:
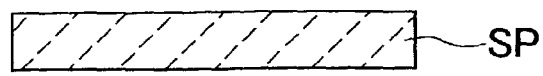
FIGS. 5A to 5E are explanatory views showing the hydrogen-permeable membrane 400 manufactured according to the flow chart shown in FIG. 4.

In step S101 (FIG. 4), as shown in FIG. 5A, the base body SP is initially prepared. As the base body, a member formed of a resin material, a ceramics material such as glass, a metal material such as Al, or the like can be employed. The base body SP is arranged in a chamber (not shown) which is in an inert atmosphere due to a nitrogen gas, an argon gas or the like.

Figure 5B:
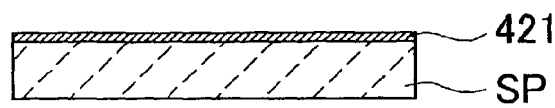
Figure 5C:
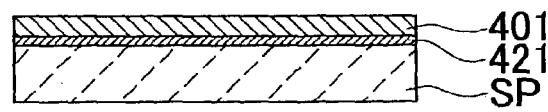
Figure 5D:
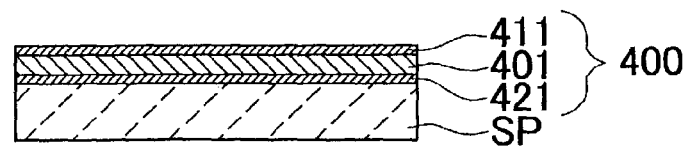

In step S102 (FIG. 4), as shown in FIGS. 5B to 5D, three layers which form the hydrogen-permeable membrane are sequentially formed. More particularly, the Pd coating layer 421 (FIG. 3) is formed on the base body SP, as shown in FIG. 5B. Next, the V base layer 401 is formed on the Pd coating layer 421, as shown in FIG. 5C. Finally, the Pd coating layer 411 is formed on the V base layer 401, as shown in FIG. 5D. Note that each layer can be formed by electroplating, electroless plating, a spatter method, an ion plating method, a CVD method, or the like.

Figure 5E:
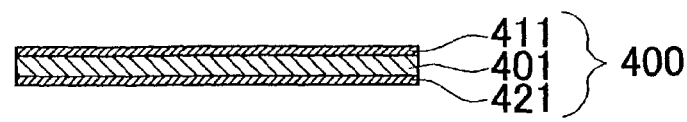

In step S103 (FIG. 4), as shown in FIG. 5E, the base body SP is removed. For example, when the base body is formed of a resin material, only the resin material is dissolved using a solvent suitable for the resin material. When the base body is formed of glass, only the glass is etched using a hydrofluoric acid. When glass with low melting point is used as the base body, only the glass can be molten by heating. Also, when the base body is formed of Al, only Al is dissolved using an alkaline solution. Thus, the hydrogen-permeable membrane 400 of the self-supporting membrane type can be obtained by removing the base body.

In the embodiment, the hydrogen-permeable membrane 400 of the self-supporting membrane type is obtained by dissolving the base body SP. However, the hydrogen-permeable membrane of the self-supporting membrane type may be obtained by removing the hydrogen-permeable membrane from the base body. This method has an advantage that the base body can be reused. However, according to the embodiment, the hydrogen-permeable membrane of the self-supporting membrane type can be easily obtained without being damaged.

As mentioned above, in the embodiment, each layer which forms the hydrogen-permeable membrane is sequentially formed in the inert atmosphere. Accordingly, the etching processing (cleaning processing) of the V base layer can be omitted, and the impurity such as the oxide can be prevented from intruding in the interface of each layer of the hydrogen-permeable membrane. Therefore, the hydrogen permeability of the hydrogen-permeable membrane can be enhanced.

In the embodiment, the base layer 401 is formed of V. However, the base layer 401 may be formed of an alloy containing V. Likewise, the coating layers 411, 421 are formed of Pd. However, the coating layers 411, 421 may be formed of an alloy containing Pd. Also, in the embodiment, a case where V is used as a Group VA element has been explained. However, Nb or Ta which has characteristics similar to V may be used in place of V. Namely, the base layer is not limited as long as it contains a Group VA element. Also, the coating layer is not limited as long as it contains Pd.

Also, in the embodiment, the hydrogen-permeable membrane of the self-supporting membrane type is used. However, the hydrogen-permeable membrane of the supporting membrane type may be used. In this case, a base body formed of a porous material in which gas can flow is prepared in step S101 shown in FIG. 4, and step S103 shown in FIG. 4 is omitted. Note that as the base body, a porous member such as a ceramics member which is formed of alumina, silicon nitride, silica or the like, and a sintered metal member which is formed of stainless steel or the like can be used. In this case, the impurity such as the oxide can be prevented from intruding in the interface of each layer of the hydrogen-permeable membrane. Accordingly, the hydrogen permeability of the hydrogen-permeable membrane can be enhanced.

B. A Second Embodiment

As explained in the first embodiment (FIG. 3), the V base layer 401 has a function of making the hydrogen permeate therethrough, and the Pd coating layers 411, 421 has a function of promoting the permeation of the hydrogen in the V base layer by acting as a catalyst on the hydrogen to promote the dissociation and the recombination of the hydrogen. Namely, the hydrogen-permeable membrane 400 includes a permeable layer which consists of the V base layer 401, and a catalyst layer which consists of the Pd coating layers 411, 421.

In the first embodiment, the reformed gas is supplied to the first surface S1 of the hydrogen-permeable membrane 400. However, the reformed gas contains the carbon monoxide gas, as shown in the equation (1). When the Pd coating layer is poisoned by the carbon monoxide gas, a rate of catalytic reaction (catalytic performance) is decreased. Also, when an operating temperature of the hydrogen-permeable membrane is relatively low (for example, below approximately 300–400 degrees Celsius), the permeability of the V base layer is enhanced. Meanwhile, the catalytic performance of the Pd coating layer deteriorates. Thus, when a catalytic poison such as the carbon monoxide gas is contained in gas which contacts the hydrogen-permeable membrane, or when the operating temperature of the hydrogen-permeable membrane is relatively low, the catalytic performance of the Pd coating layer deteriorates. As a result, the hydrogen permeability of the hydrogen-permeable membrane deteriorates.

Accordingly, in the embodiment, the hydrogen permeability of the hydrogen-permeable membrane is enhanced by using the devised catalyst layer which forms the surface of the hydrogen-permeable membrane. More particularly, a contact area of the catalyst layer which contacts gas is increased, as described later.

Figure 6:
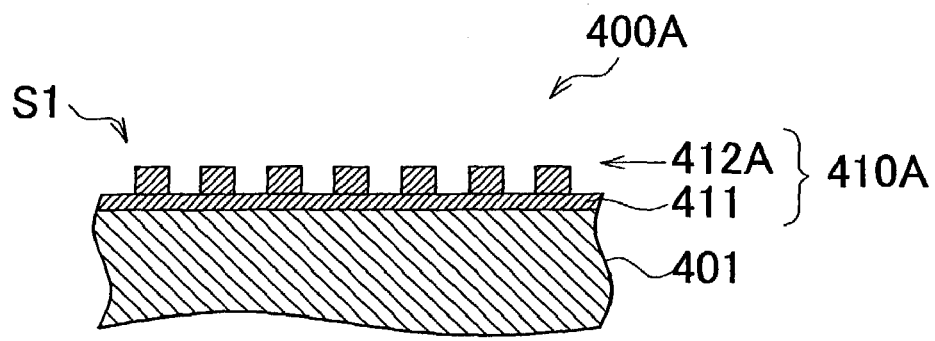
FIG. 6 is a vertical sectional view in schematic form showing an enlarge view in the vicinity of a surface of a hydrogen-permeable membrane 400A which is a second embodiment.

B-1. Hydrogen-Permeable Membrane According to a Second Embodiment:

FIG. 6 is a vertical sectional view in schematic form showing an enlarge view in the vicinity of a surface of a first hydrogen-permeable membrane 400A according to the second embodiment. Note that the area in the vicinity of the surface of the first surface S1 of the hydrogen-permeable membrane 400A is shown in FIG. 6. However, the second surface (a surface corresponding to the second surface S2 of the hydrogen-permeable membrane 400 shown in FIG. 3) has the same structure as the first surface S1.

In the hydrogen-permeable membrane 400A, a catalyst layer 410A consists of the Pd coating layer 411 and a contact-area-increasing layer 412A which is provided on the Pd coating layer 411. The contact-area-increasing layer 412A includes a plurality of convex portions which is formed of Pd. The convex portions are in a substantially rectangular parallelopiped shape, and are arranged on the Pd coating layer 411 in a matrix configuration.

The catalyst layer 410A is formed, for example, by forming the Pd coating layer over the V base layer, partly masking the Pd coating layer, and laminating the Pd layer. Then, the masking is further removed from the catalyst layer 410A. Alternatively, the catalyst layer 410A is formed by forming the relatively thick Pd layer over the V base layer, and partly etching the Pd layer.

Note that the convex portion is formed of Pd in FIG. 6. However, the convex portion may be formed of a Pd alloy containing Pd. Also, the convex portion may contain Ru (ruthenium), Rh (rhodium), Ir (iridium), Pt (platinum), Re (rhenium), Ni (nickel) and the like.

Figure 7:
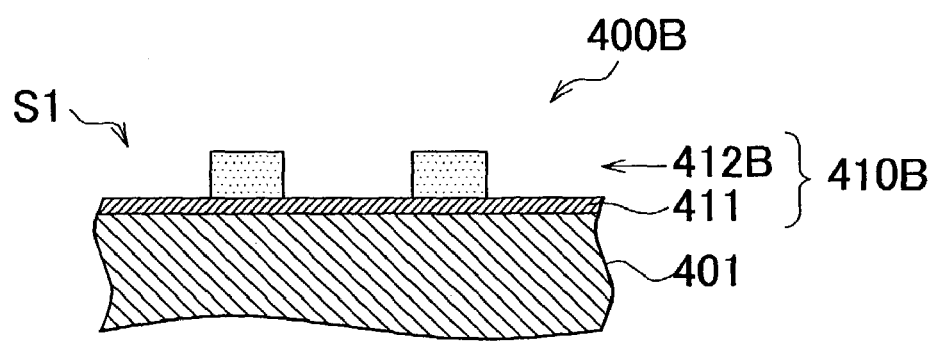
FIG. 7 is a vertical sectional view in schematic form showing an enlarge view in the vicinity of a surface of a hydrogen-permeable membrane 400B which is a first modified example of the second embodiment.

B-2. Hydrogen-Permeable Membrane According to a First Modified Example:

FIG. 7 is a vertical sectional view in schematic form showing an enlarge view in the vicinity of a surface of a hydrogen-permeable membrane 400B which is a first modified example of the second embodiment. In the hydrogen-permeable membrane 400B, the catalyst layer 410B consists of the Pd coating layer 411 and a contact-area-increasing layer 412B. The contact-area-increasing layer 412B includes a plurality of supporting Pd catalysts (convex portions) which is formed by a carrier supporting Pd. A plurality of the supporting Pd catalysts has a substantially cylindrical shape, and is arranged on the Pd coating layer 411 in a matrix configuration.

Note that the supporting Pd catalyst is a catalyst in which an active ingredient (Pd) is dispersed and supported on the surface of the carrier in a particulate form or a membrane form. In FIG. 7, the carrier is formed of a porous material such as almina. The hydrogen atom, which is dissociated by Pd on the carrier, moves on the surface of the carrier to reach the Pd coating layer 411 by a phenomenon called "spillover".

The catalyst layer 410B is formed, for example, by forming the Pd coating layer over the V base layer, arranging the supporting Pd catalyst on the Pd coating layer, and performing heating and high-pressure processing. Note that the supporting Pd catalyst is fixed on the Pd coating layer by mutual diffusion between the Pd on the carrier and Pd forming the coating layer.

Note that the supporting catalyst supports Pd. However, the supporting catalyst may support Ru, Rh, Ir, Pt, Re, Ni or the like in place of Pd. Also, surface of the supporting Pd catalyst may be uneven surface as the convex portion of the FIGS. 8 to 10 to be hereinafter described.

Figure 8:
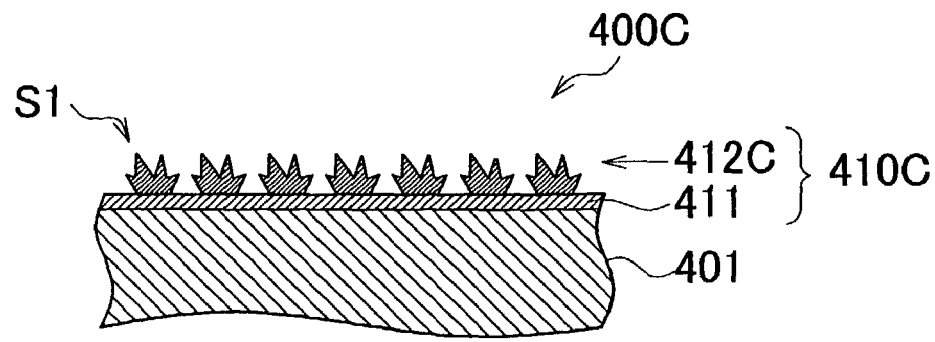
FIG. 8 is a vertical sectional view in schematic form showing an enlarge view in the vicinity of a surface of a hydrogen-permeable membrane 400C which is a second modified example of the second embodiment.

B-3. Hydrogen-Permeable Membrane According a Second Modified Example:

FIG. 8 is a vertical sectional view in schematic form showing an enlarge view in the vicinity of a surface of a hydrogen-permeable membrane 400C which is a second modified example of the second embodiment. In the hydrogen-permeable membrane 400C, the catalyst layer 410C consists of the Pd coating layer 411 and a contact-area-increasing layer 412C. The contact-area-increasing layer 412C includes a plurality of Pd black fine powder (convex portion). Note that the Pd black is black palladium in fine power form which can be obtained when a chemical compound such as a salt, an oxide or a hydroxide of the palladium is reduced. The Pd black has an uneven surface, and is provided on the Pd coating layer while being dispersed at a substantially uniform area density.

The catalyst layer 410C is formed, for example, by forming the Pd coating layer over the V base layer, applying a suspension containing the Pd black and an organic solvent on the Pd coating layer, and heating the V base layer, and Pd coating layer and the suspension at a temperature which is higher than the operating temperature of the hydrogen-permeable membrane. Note that the organic solvent is removed and the Pd black is fixed on the Pd coating layer by heating.

Note that the Pd black is used in FIG. 8. However, Pt black or the like may be used in place of Pd black.

Figure 9:
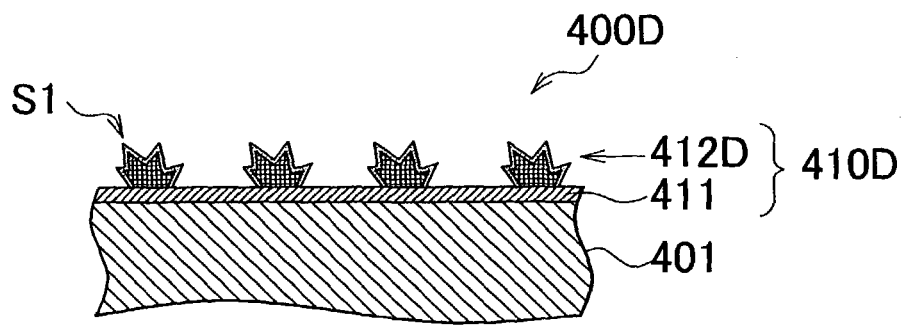
FIG. 9 is a vertical sectional view in schematic form showing an enlarge view in the vicinity of a surface of a hydrogen-permeable membrane 400D which is a third modified example of the second embodiment.

B-4. Hydrogen-Permeable Membrane According to a Third Modified Example:

FIG. 9 is a vertical sectional view in schematic form showing an enlarge view in the vicinity of a surface of a hydrogen-permeable membrane 400D which is a third modified example of the second embodiment. In the hydrogen-permeable membrane 400D, the catalyst layer 410D consists of the Pd coating layer 411 and a contact-area-increasing layer 412D. The contact-area-increasing layer 412D includes a plurality of convex portions which is covered with the Pd membrane. The convex portion whose nucleus is a metal (for example, Pd) has an uneven surface and is provided on the Pd coating layer 411 while being dispersed at a substantially the uniform area density.

The catalyst layer 410D is formed, for example, by forming the Pd coating layer over the V base layer, arranging the metal (for example, Pd) nucleus on the Pd coating layer, and selectively providing a Pd plating membrane on a periphery of the nucleus by electoless Pd plating. Note that when a certain electroless is employed, porous (in a sponge form) Pd plating membrane can be formed. Also, as a nucleus, another metal may be employed in place of Pd.

Note that in FIG. 9, the Pd plating membrane is formed on the uneven surface of the convex portion. However, a membrane of Ru, Rh, Ir, Pt, Re, Ni or the like may be formed in place of Pd.

Figure 10:
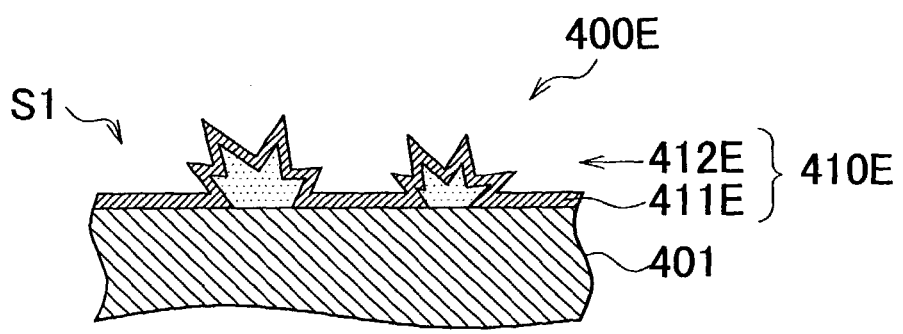
FIG. 10 is a vertical sectional view in schematic form showing an enlarge view in the vicinity of a surface of a hydrogen-permeable membrane 400E which is a fourth modified example of the second embodiment.

B-5. Hydrogen-Permeable Membrane According to a Fourth Modified Example:

FIG. 10 is a vertical sectional view in schematic form showing an enlarge view in the vicinity of the surface of a hydrogen-permeable membrane 400E which is a fourth modified example of the second embodiment. In the hydrogen-permeable membrane 400E, a catalyst layer 410E consists of a Pd coating layer 411E and a contact-area-increasing layer 412E. The contact-area-increasing layer 412E includes a plurality of convex portions which is covered with the Pd layer. The convex portion in which the Pd layer is laminated on the carrier which is arranged on the V base layer has an uneven surface, and is arranged on the Pd coating layer 411E while being dispersed at a substantially uniform area density.

The contact layer 410E is formed, for example, by arranging a ceramics carrier such as alumina, cilica or zirconia on the V base layer and then laminating the Pd layer. Note that the Pd layer is laminated after the ceramics carrier is temporarily fixed on the V base layer by heating.

Figure 11:
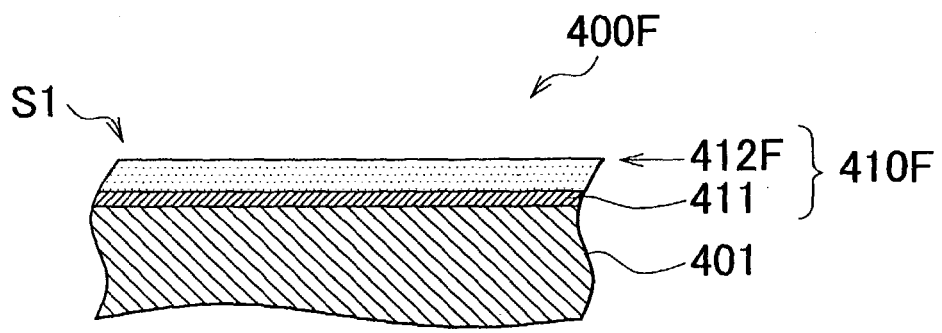
FIG. 11 is a vertical sectional view in a schematic form showing an enlarge view in the vicinity of a surface of a hydrogen-permeable membrane 400F which is a fifth modified example of the second embodiment.

B-6. Hydrogen-Permeable Membrane According to a Fifth Modified Example:

FIG. 11 is a vertical sectional view in schematic form showing an enlarge view in the vicinity of a surface of a hydrogen-permeable membrane 400F which is a fifth modified example of the second embodiment. In the hydrogen-permeable membrane 400F, a catalyst layer 410F consists of the Pd coating layer 411 and a contact-area-increasing layer 412F. The contact-area-increasing layer 412F is a porous layer containing Pd, and is formed so as to cover the Pd coating layer 411.

The contact layer 410F is formed, for example, by forming the Pd coating layer 411 over the V base layer, composite-plating Pd and a resin on the Pd coating layer 411, and then dissolving the resin using a solvent. Note that as a resin, PTFE (polytetrafluoro-ethylene) or the like may be employed.

Note that the porous layer contains Pd in FIG. 11. However, the porous layer may contain Ru, Rh, Ir, Pt, Re, Ni or the like in place of Pd.

The hydrogen-permeable membranes 400A to 400F shown in FIGS. 6 to 9 and FIG. 11 can be manufactured, for example, by forming the Pd coating layer on both surfaces of the V base layer (foil), and then forming the contact-area-increasing layer. Alternatively, the hydrogen-permeable membranes 400A to 400F shown in FIGS. 6 to 9 and FIG. 11 may be manufactured by preparing the hydrogen-permeable shown in FIG. 3 using the manufacturing method according to the first embodiment (FIGS. 4, 5), and then forming the contact-area-increasing layer on each of the coating layers 411, 421. Note that the hydrogen-permeable membrane 410E shown in FIG. 10 can be manufactured by forming the V base layer, being temporarily fixed the ceramics carrier on the V base layer by heating, and then laminating the Pd layer in S102 shown in FIG. 4. When the manufacturing method according to the first embodiment is employed, the impurity can be prevented from intruding in the interface of each layer of the hydrogen-permeable membrane. As a result, an advantage that deterioration of the hydrogen permeability due to the impurity can be suppressed is offered.

As described above, the hydrogen-permeable membranes 400A to 400F according to the embodiment, includes the permeable layer (base layer) 401 having a function of making the hydrogen permeate therethrough, and the catalyst layers 410A to 410F which act as catalysts for promoting the permeation of the hydrogen in the permeable layer. Then, the catalyst layers 410A to 410F include the coating layer 411 which covers the permeable layer 401 and the contact-area-increasing layers 412A to 412F. The contact-area-increasing layers 412A to 412E shown in FIGS. 6 to 10 have relatively large surface areas. Also, the contact-area-increasing layer 412F shown in FIG. 11 has an inner space. Namely, a contact area of the catalyst layer 410F which contacts gas is larger than an area in which the permeable layer 401 contacts the Pd coating layer 411. In other words, the contact area of the catalyst layer 410F which contacts gas is larger than an area of a portion of the permeable layer 401, in which the catalyst layer 410F is provided. Thus, when the contact area of the catalyst layer is increased, the number of active spots in the catalyst layer becomes relatively large. Accordingly, the rate of catalytic reaction (catalytic performance) by the catalyst layer can be enhanced. As a result, the hydrogen permeability of the hydrogen-permeable membrane can be enhanced.

Also, in the hydrogen-permeable membrane according to the embodiment, the number of active spots in the catalyst layer is relatively large. Therefore, even when a catalytic poison such as the carbon monoxide gas is contained in gas which contacts the hydrogen-permeable membrane, or when the operating temperature of the hydrogen-permeable membrane is relatively low, relatively high hydrogen permeability can be exhibited. Note that the thicker the permeable layer (V base layer) is, the more difficult it is for the hydrogen to permeate through the layer. Accordingly, the thinner the used V base layer is, the more the hydrogen permeability can be enhanced.

In the embodiment, the hydrogen-permeable membrane of the self-supporting membrane type is employed, and the contact-area-increasing layer is provided on each of the two coating layers of the hydrogen-permeable membrane. However, the contact-area-increasing layer may be provided on one of the coating layers. For example, it is preferable to provide the contact-area-increasing layer at least on the first surface, when a poisoning item such as the carbon monoxide gas which poisons Pd is provided on the first surface S1 of the hydrogen-permeable membrane. Also, in the embodiment, the hydrogen-permeable membrane of the self-supporting membrane type is employed. However, the hydrogen-permeable membrane of the supporting membrane type may be used. In this case, the contact-area-increasing layer may be provided only on one of the coating layers which is not adjacent to the carrier.

Also, in the embodiment, the catalyst layers 410A to 410F include the Pd coating layer 411. This is to prevent the V base layer from being oxidized by covering the V base layer 401, which is relatively easy to oxidize, with the Pd coating layer 411, which is relatively difficult to oxidize. However, when the hydrogen-permeable membrane is not exposed to an oxidizing atmosphere, the catalyst layer need not include the Pd coating layer.

Namely, a catalyst layer is required to have a contact area which contacts gas and is larger than an area of the permeable layer which contacts the catalyst layer. The catalyst layer is required to be provided on at least one surface of the permeable layer.

C. A Third Embodiment

In the second embodiment, the number of active spots is increased by increasing the contact area of the catalyst layer in order to enhance the permeability of the catalyst layer. However, a reaction rate (this is also referred to as a turnover frequency) per an active spot may be increased in place of increasing the number of active spots.

Figure 12:
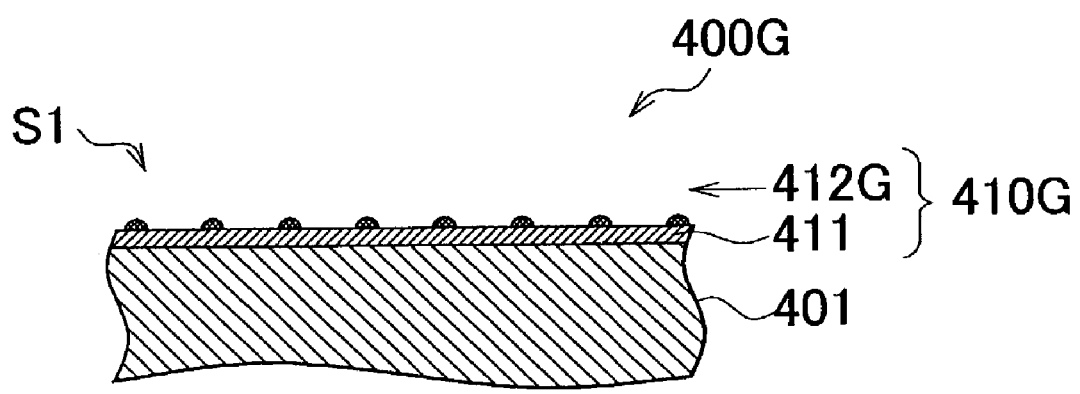
FIG. 12 is a vertical sectional view in schematic form showing an enlarge view in the vicinity of a surface of a hydrogen-permeable membrane 400G which is a third embodiment.

FIG. 12 is a vertical sectional view in schematic form showing an enlarge view in the vicinity of a surface of a hydrogen-permeable membrane 400G according to a third embodiment. In the hydrogen-permeable membrane 400G, a catalyst layer 410G consists of the Pd coating layer 411 and a reaction rate increasing layer 412G which is provided on the Pd coating layer 411. The reaction rate increasing layer 412G includes a convex portion formed of Pt. Note that the convex portion is provided on the Pd coating layer 411 while being dispersed at a substantially uniform area density.

The catalyst layer 410G is formed, for example, by forming the Pd coating layer over the V base layer, and then laminating Pt (the convex portions in the figure) onto the Pd coating layer for a short period of time such that the Pt does not cover the entire Pt coating layer. Note that the convex portion can be formed by electroplating, electroless plating, a spatter method, an ion plating method, a CVD method, or the like.

As mentioned above, the hydrogen-permeable membrane 400G includes the permeable layer 401 which contains a Group VA element and has a function of making the hydrogen permeate therethrough, and the catalyst layer 410G which acts as a catalyst to promote the permeation of the hydrogen in the permeable layer. Also, the catalyst layer 410G includes the Pd coating layer 411 which covers the permeable layer 401, and the reaction rate increasing layer 412G which is provided on the coating layer 411 and formed of Pt. The reaction rate per an active spot in Pt is higher than that in Pd. Thus, when a metal element whose reaction rate per an active spot is high is selected, a rate of catalytic reaction (catalytic performance) by a catalyst layer can be increased. As a result, the hydrogen permeability of the hydrogen-permeable membrane can be enhanced.

Note that the convex portion is formed of Pt in FIG. 12. However, the convex portion may be formed of a Pt alloy containing Pt. Also, the convex portion may contain Ru, Rh, Ir, Re, Ni, or the like. Ru is particularly suitable for a fuel cell system shown in FIG. 1 since Ru has a relatively high catalytic performance and is not likely to be poisoned by the carbon monoxide gas. Like this, a metal element may be selected in accordance with a use condition of the hydrogen-permeable membrane such as a temperature, a gas atmosphere, a pressure or the like.

In FIG. 12, the reaction rate increasing layer 412G includes the convex portion which is partly formed on the Pd coating layer 411. However, the reaction rate increasing layer may include the Pt layer which covers the entire Pd coating layer. In this case, the Pd coating layer may be omitted. Namely, when the Pt layer is provided on the entire area of the V base layer 401, the V base layer 401, which is relatively easy to oxidize, is covered with the Pt layer. Accordingly, even when the Pd coating layer is omitted, oxidization of the V base layer can be prevented. Note that since the hydrogen permeability of Pt is not remarkably high, it is preferable to make the Pt layer as thin as possible.

Furthermore, in the embodiment, the catalyst layer 410G includes the Pd coating layer 411. However, when the hydrogen-permeable membrane is not exposed to the oxidizing atmosphere, the Pd coating layer may be omitted.

Namely, in general, the catalyst layer needs to contain at least one metal element selected from the group consisting of Ru, Rh, Ir, Pt, Re, and Ni.

Note that the invention is not limited to the above-mentioned embodiment, and can be implemented in a variety of forms without departing from spirit of the invention. For example, the following modifications are available.

(1) In the above-mentioned embodiment, the hydrogen-permeable membrane is formed in sheet form. However, the hydrogen-permeable membrane may be formed in cylindrical form. In this case, it is preferable to extract the hydrogen outside the cylinder so as to make the reformed gas flow inside the cylinder.

(2) In the above-mentioned embodiment, the fuel cell system includes the fuel gas supplying portion 200 which generates the hydrogen gas using methanol. However the fuel cell system may include a fuel gas supplying portion which generates the hydrogen gas using another alcohol, a natural gas, gasoline, ether, an aldehyde or the like in place of using methanol. In general, as a raw material, a variety of hydrocarbon compounds which contains hydrogen atom can be used.

Also, in the above-mentioned embodiment, the fuel cell system includes a fuel gas supplying portion 200 which generates the hydrogen gas by reforming the methanol. However, the fuel cell system may include a fuel gas supplying portion which obtains the hydrogen gas from a hydrogen storing alloy or a hydrogen cylinder in place of generating the hydrogen gas by reforming the methanol. In these cases, the hydrogen-permeable membrane according to the embodiment of the invention can be applied to the fuel cell system in order to improve a purity of the hydrogen.

(3) In the above-mentioned embodiment, a case where the hydrogen-permeable membrane according to the embodiment of the invention is applied to the fuel cell system using a polymer electrolyte fuel cell has been described. However, the hydrogen-permeable membrane according to the embodiment of the invention may be applied to a fuel cell system using another type of fuel cell. Also, the hydrogen-permeable membrane according to the invention can be applied to a hydrogen purification device.

What is claimed is:

1. A hydrogen-permeable membrane comprising:
    a permeable layer containing a Group VA element and through which hydrogen is permeatable; and
    a catalyst layer which promotes permeation of hydrogen in the permeable layer, and which is provided on at least one surface of the permeable layer so as to form a surface layer of the hydrogen-permeable membrane, and whose contact area that contacts gas is larger than an area of the permeable layer;
    wherein the catalyst layer includes a first layer which covers the permeable layer, and a second layer which is provided on the first layer in order to make the contact area larger than the area of the permeable layer.

2. The hydrogen-permeable membrane according to claim 1, wherein the second layer includes a convex portion which is provided on the first layer.

3. The hydrogen-permeable membrane according to claim 2, wherein the convex portion is a supporting catalyst.

4. The hydrogen-permeable membrane according to claim 2, wherein the convex portion includes an uneven surface.

5. The hydrogen-permeable membrane according to claim 1, wherein the second layer is a porous layer.

6. The hydrogen-permeable membrane according to claim 1, wherein the permeable layer contains a Group VA element, the first layer contains Pd, and the second layer contains at least one metal element selected from a group consisting of Ru, Rh, Pd, Ir, Pt, Re, and Ni.

7. The hydrogen-permeable membrane according to claim 1, wherein the catalyst layer includes a first layer which covers the permeable layer, and a second layer which is provided on the first layer, and whose reaction rate at which a hydrogen atom is dissociated from a hydrogen molecule is higher than that of the first layer.

8. The hydrogen-permeable membrane according to claim 7, wherein the first layer contains Pd.

9. A manufacturing method of the hydrogen-permeable membrane which makes hydrogen selectively permeate therethrough, comprising
    preparing a base body;
    arranging the base body in an inert atmosphere; and
    sequentially forming, in the inert atmosphere, a first layer which contains Pd on the base body, a second layer which contains a Group VA element on the first layer, and a third layer which contains Pd on the second layer.

10. The method according to claim 9, wherein the base body is formed of a porous material.

11. The method according to claim 9, further comprising removing the base body.

* * * * *